United States Patent

Pinede et al.

[15] 3,689,705

[45] Sept. 5, 1972

[54] SYSTEM FOR PARTY LINE SIGNALLING USING RE-ENCODED RINGING SIGNALS

[72] Inventors: Edouard Pinede; Abraham De Kam, both of Guelph, Ontario, Canada

[73] Assignee: International Standard Electric Corporation, New York, N.Y.

[22] Filed: June 8, 1970

[21] Appl. No.: 44,220

[30] Foreign Application Priority Data

June 16, 1969 Canada........................54,496

[52] U.S. Cl..............................179/17 E, 179/84 VF

[51] Int. Cl..............................................H04m 3/02

[58] Field of Search..179/17 E, 16 EC, 84 SS, 84 VF

[56] References Cited

UNITED STATES PATENTS

| | | | |
|---|---|---|---|
| 3,597,551 | 8/1971 | Arneberg et al. | 179/84 VF |
| 3,036,163 | 5/1962 | Bachelet | 179/17 E X |
| 2,824,173 | 2/1958 | Meacham | 179/17 E |
| 3,026,377 | 3/1962 | Sullivan | 179/87 |
| 2,763,726 | 9/1956 | Weller | 179/17 E X |
| 3,562,434 | 2/1971 | Ohzeki et al. | 179/16 A |

*Primary Examiner*—Kathleen H. Claffy
*Assistant Examiner*—Thomas W. Brown
*Attorney*—C. Cornell Remsen, Jr., Walter J. Baum, Paul W. Hemminger, Charles L. Johnson, Jr., James B. Raden, Delbert P. Warner and Marvin M. Chaban

[57] ABSTRACT

A telephone party line signalling system which employs an electronic monitor circuit at the output end of a central office switching circuit to detect the code of any coded ringing signal emanating from the office. Responsive to this code, the monitor circuit stores and re-encodes these signals into a signal in other forms. The re-encoded signal is sent out over a called line, the other signal form being a multifrequency set of tones which characterize a particular digit in the well known pushbutton tone signalling, for example. Each subscriber station is adapted to respond to the combination of the frequencies comprising these tones and to locally supply ringing current to its own subscriber station.

6 Claims, 8 Drawing Figures

SYSTEM FOR PARTY LINE SIGNALLING USING RE-ENCODED RINGING SIGNALS

This invention relates to selective code ringing and more particularly to means for selecting one of a plurality of codes identifying a given subscriber and for ringing the telephone of only that —and no other — subscriber.

In the past, party line subscribers have generally been rung in either of two manners. First, frequency selective ringing may be used wherein one of several frequencies is selected and sent over a party line. Only the ringer tuned to that particular frequency will ring. Second, a coded ringing signal is selected and sent over the party line to all subscriber stations. Usually, all phones on the line ring, and each subscriber must listen to every ring in order to detect his particular code. This way all subscribers are bothered everytime that a call is made to any party on the subscriber line.

These schemes are used in places where there is a limited transmission capacity and many subscribers must share the same party line. Generally speaking, that capacity is, in turn, a function of population density. Hence, in rural or in underdeveloped countries of the world having wide land areas with few houses, it is convenient to run a single line or to use subscriber carrier, or other means, to give service to more parties without added costs for the telephone lines.

As the subscriber carrier technology improves, the lines serve still more subscribers, and the problems of signalling become more acute. For example, a subscriber carrier system could be designed to serve, say 10 –25 subscriber stations. This number of stations is much greater than the number of frequencies that are available for purely frequency signalling. If the problem is solved by using coded ringing, signalling becomes too complicated. For example, a subscriber would become annoyed having to listen to bells ring everytime that anyone of, say, 25 subscriber stations is rung. Moreover, it is frustrating and difficult for the subscriber who must recognize a complex code such as, say, three long rings followed by four short rings, followed by one long ring.

There are, of course, methods of simplifying the problem as by connecting half of the ringers to one side of the line and half to the other side and by using positive and negative ringing voltages. However, these methods are inherently limited as to the stations served; technology is increasing the numbers of stations which can be added to the "party line." Hence, any of these code signalling expedients tends to retain the existing limitations and fail to build toward the improved carrier systems which will become available in the future.

Other considerations are to build signalling systems which are compatible with as many different types of transmission media as possible, such as open wire lines, concentrators, subscriber carrier, and the like. The power requirements should be held to a minimum in order to eliminate the bulk of equipment at the subscriber end of the line, and to reduce the drain from the central office battery. Moreover, this must be done at the least possible cost since subscriber equipments are the most numerous items in a telephone system, and any increment of cost added at this point is multiplied many times over throughout the system, and it becomes very expensive.

Accordingly, an object of this invention is to provide new and improved "party line" signaling. In particular, an object is to provide a code call system for virtually an unlimited number of stations on any given line with ringing current supplied to only the called one of the stations.

A further object is to accomplish the foregoing at a minimum cost and with a minimum current drain.

In keeping with an aspect of this invention, an electronic monitor circuit at the output end of a central office switching circuit detects the code of any ringing current emanating from the office. Responsive to this code, the monitor circuit sends another signal over a called line, the other signal being in the form of a multi-frequency set of tones which characterize a particular digit in the well known pushbutton tone signalling, for example. Each subscriber station is adapted to respond to the frequencies of one of these tones and to locally supply ringing current to the indicated subscriber bell. This way, only one party line bell is rung responsive to a coded ringing signal nominally sent out to all stations on the line.

The above mentioned and other features and objects of this invention and the manner of obtaining them will become more apparent, and the invention itself will be best understood by reference to the following description of an embodiment of the invention taken in conjunction with the accompanying drawings, in which.

Figure 1:
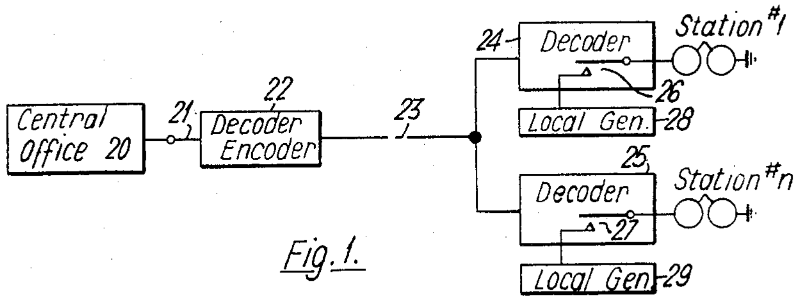
FIG. 1 is a block diagram showing the part of a telephone system which includes the invention.

The invention dies not concern itself with the nature of equipment in a telephone central office 20 ( FIG. 1); any suitable equipment will do. However, it may operate when a call is extended to a terminal point 21 which is at the outgoing end of a party line to a called subscriber station. Depending upon the directory number sent by a calling subscriber, this terminal point 21 is seized and coded ringing current is sent out to it. Any conventional means is used to select and send the ringing code, because the invention is compatible with all known code selection devices.

This invention provides an electronic monitor circuit 22, designated decoder encoder, for monitoring all ringing current which is sent out from the central office 20 toward a party line 23, which may be any suitable transmission medium, such as a physical line, a carrier channel, or the like. Depending upon the code that is received, this circuit 22 re-encodes it as a multi-frequency signal of the type commonly used by pushbutton telephones. The decoder-encoder 22 may make any suitable code conversion; however, one exemplary code is described hereinafter so that a concrete example may be given. The output from the decoder-encoder 22 is then sent out in any suitable manner over a transmission medium 23.

A number of local subscriber stations are connected to the line 23 via decoder units, such as 24, 25, which may be individually associated. Each decoder contains a circuit adapted to detect the multi-frequency signals identifying a particular station. When the decoder does respond to its own individual frequencies, any suitable device, here represented by the contacts 26, 27 applies the output of a local generator 28, 29, respectively, to the local subscriber bell. This way, no bell will ring at any time except when its individually associated code is sent over the transmission medium 23.

Figure 2:
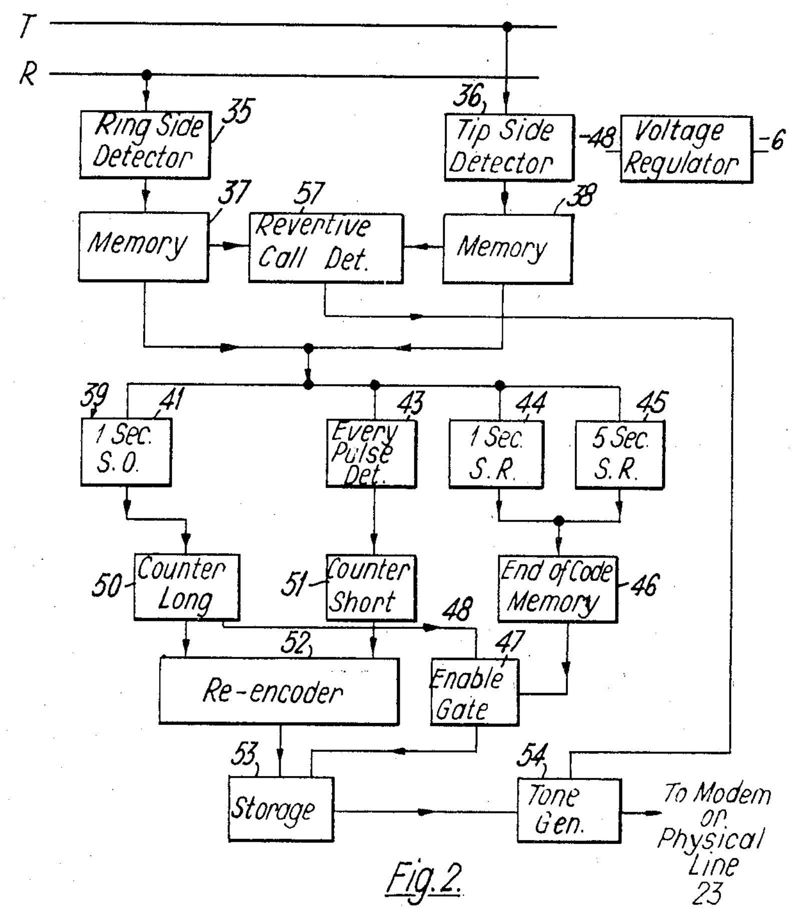
FIG. 2 is a block diagram of the central office encoder-decoder part of the system.

The details of the decoder-encoder 22 are broadly shown in FIG. 2 as being individually connected to the usual tip and ring conductors T and R. If any ring currents appear on either of these conductors, it trips one of the detectors 35 or 36. Responsive thereto, a memory of the ringing currents occurrence is stored at 37 or 38, and applied to all of the timers 39. These timers have characteristic time cycles such as those explained by the curves of FIG. 8.

Figure 8:
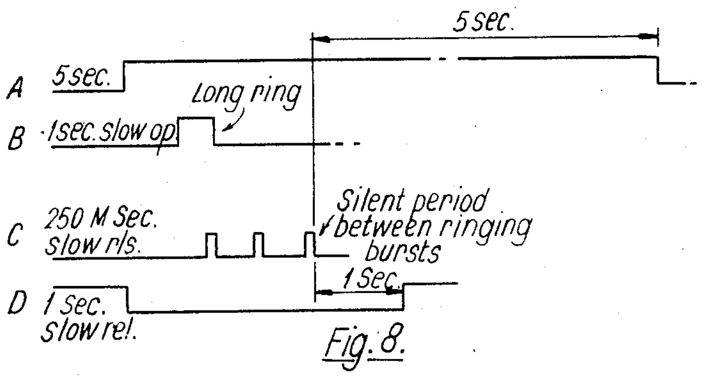
FIG. 8 ( on drawing sheet 1) shows the timing relationship of certain circuits appearing in the drawings.

The timer 41 measures long rings, as shown by curve B, FIG. 8. The timer 43 measures the space which separates the successive bursts of a single ringing code, as shown by curve D, FIG. 8. The end of code timer 44 detects a silent period (curve E, FIG. 8) which is longer than the longest space between any bursts of ring current, which, therefore, means an end of a ringing code. The end of signalling timer 45 measures a five second period (curve A, FIG. 5) which is much longer than any complete ringing code, and then it resets the logic circuits to their zero condition. A memory circuit 46 is thereupon set to store this zero condition. Finally, the end of code memory 46 causes an enable gate 47 to trigger a readout of the stored ringing code.

Means are provided for preventing a faulty operation wherein a trailing fragment of one code remains stored to mutilate the next ringing code. More particularly, the ringing code (FIG. 7) is arranged so that the first burst of ringing current is always a long ring. Responsive thereto, the long burst counter 50 sends a signal to input 47 of the enable gate 47. Hence, there is a coincidence between a stored memory indicating the detection of the end of a ringing code by the timer 44 and the detection of the start of the next ringing code by the timer 41.

As the ringing code comes in, each long burst of ringing is counted at 50; the short bursts of ringing are counted at 51. The resulting counts are then applied to a re-encoder 52 where they are converted or re-encoded into an indication of a particular multi-frequency code. Conveniently, this code may be one of the well known pushbutton telephone dial codes or single frequency tones. The re-encoded output is stored at 53 until the end of the signalling is detected by the timer 45.

After a full complement of a complete ringing code is received, the information stored at 53 is used to trigger a set of tone generators 54 according to the indicated re-coding. These frequencies are then sent out over the carrier channel or party line 23 leading to a called subscriber.

Means are provided for detecting revertive calls. In greater detail, revertive calls are characterized by a burst of ringing current sent over both the tip ( T) and ring ( R) sides of the line; whereas ringing current is normally sent over only one side during normal ringing. During revertive calls, one side is rung because that is the side having the ringer at the called station, and the other side is rung so that the calling party will know that the called station is being rung. Hence, the revertive call detector 57 responds when it receives a signal from both the tip and ring memory circuits 37, 38. Responsive thereto, a direct signal is given to the tone generator 54, and a special revertive call signal is sent out over the line.

Figure 3:
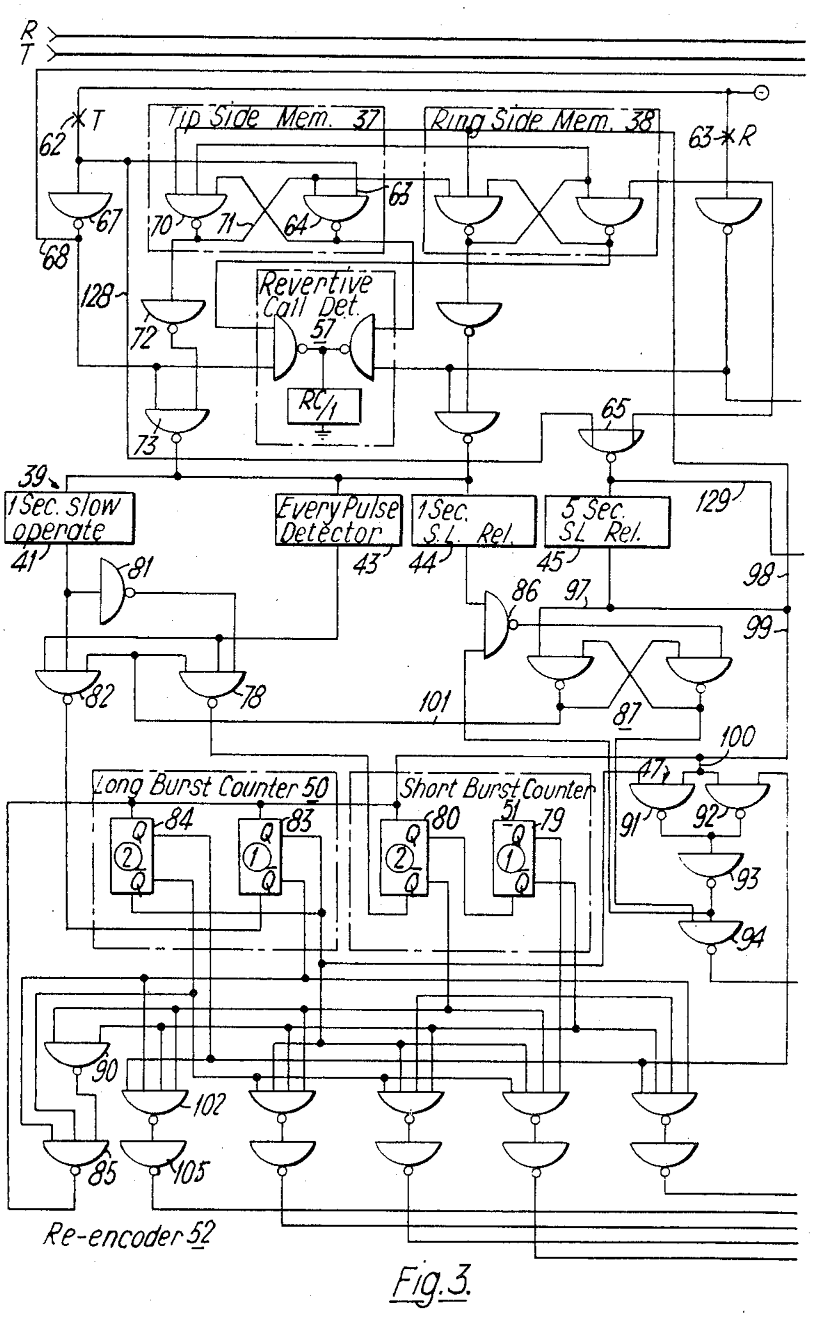
FIGS. 3 –5 show the central office part of the system by logic diagrams, and the subscriber terminal station part by a circuit diagram using discrete components.

The foregoing description broadly covers the equipments which are provided for accomplishing the aims and objectives of the invention. The following description of FIGS. 3 –5 set forth the logic of an exemplary circuit for one embodiment of the invention. The various functional groupings of the logic circuits are separated by dot-dashed lines which are numbered to correspond to the reference numerals which identify the boxes of FIG. 2. Other embodiments will also occur to those who are skilled in the art. Therefore, the invention is not to be construed as necessarily limited to this particular logic.

Two rectifier-bridge relay combinations 35, 36 are individually connected to the tip and ring sides T and R of the line. Hence, one of these relays operates whenever ringing current is sent out over the line. If the ringing current appears on the tip side, the T relay 35 operates, and the T contacts 62 close; or, if on the ring side, the R relay 36 operates, and the R contacts 63 close. Either way, there are essentially similar responses. Therefore, it is thought that only the response to tip side ringing need be explained in detail.

Responsive to the receipt of tip side ringing current, relay 35 operates with a resulting closure of contacts 62. A signal appears at the input of inverter 67 to remove the output of the NAND gate 73, and it is applied through the OR gate 65 to start the five-second reset timer 45. Everything which occurs responsive to this receipt of ringing current occurs well before this five-second timer times out and resets the logic to normal. This way, the circuit cannot remain in an off-normal condition more than five seconds after the end of signalling regardless of any action or inaction on the part of the subscriber and regardless of any associated machine responses. Finally, the inverter gate 67 acts over wire 68 to remove an inhibit and thereby enable the gates in the re-encoder circuit 52 to prepare for their response to the ringing current code.

A memory that ringing current appeared on the tip side of the line is stored in memory circuit 37. In greater detail, when relay 35 operates and the contacts 62 close, the NAND gate 64 removes its output from the input to gate 70. A signal feeds back over wire 71 to hold gate 64 and thereby lock the memory 37 in an off-normal condition. The signal on wire 71 also holds the ring side memory 38 in a normal condition. out The inverters 67 and 72 present a coincidence of signals at the input of NAND gate 73, which starts the ringing current timer 41, and the inter-burst timers 44, 45. A short and long burst of ringing current is detected by timer 43. A long burst is detected by timer 41. At the end of each burst of ringing, the relay 35 releases, contacts 62 open, and the output from inverter gate 67 reappears at the input of the gate 73. The timer 44 measures a long period of silence when no ringing current appears on the line. Detector 43 is a timing circuit which detects every pulse on the line. If the ringing current reappears on the line, after timer 43 times ut and before the timer 44 times out, the system recognizes a normal space between coded ringing bursts. But, if ringing current does not reappear before the timer 44 times out, the system recognizes that the end of the entire ringing code has occurred.

Each coded burst of ringing current is counted as it comes in. Assume first that a long [1 ½ sec. (FIG. 7)] burst comes in; timer 41 also times out, the gate 81 inhibits gate 78 and prevents the short burst counter 51 from responding. One long burst causes a signal to be sent through gate 82, and flip-flop 83 switches its output to its terminal Q. During the normal [one-half sec. (FIG. 7)] silent time space between successive bursts of ringing current, the one second timer 44 cannot time out; therefore, it holds the count in the counters 50, 51 as shown by curve E of 58. If a short [one-half sec. (FIG. 7)] burst of ringing current is received, the every pulse detector 43 provides an output and, via gate 78, signals a current of such a short burst to counter 51. If one short burst comes in flip-flop 80 switches its output from the terminal Q to its output at terminal $\overline{Q}$ and flip-flop 79 has its output at terminal Q.

If the one second timer 44 should time out before the next burst of ringing current is received, it indicates that the entire code has ended. In response to timer 44, gate 86 turns on the end of code memory 87. Since a long burst is stored in flip-flop 83 of counter 50, gate 91 opens and ultimately turns on gate 94 and transistor 96 switches on. Transistor 96 enables re-encoder 52.

An inhibit signal is sent to gate 78 and 82 over wire 101 which prevents any more signals from passing to the counters since this is the end of a coded signal.

At the end of 5 seconds, after the passage of enough time for the entire code of ringing currents to be received, the timer 45 times out [curve A (FIG. 8) ] and resets everything to normal. More particularly, at the start of the 5 second period, a normal start condition is indicated when everything has been reset under influence of timer 45. After a single long burst of ringing current is received at the start of a code, a signal from the output terminal Q of flip-flop 84 is sent to an input on gate 92.

Figure 7:
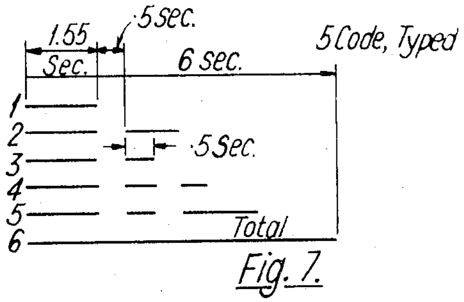
FIG. 7 ( on drawing sheet 1) shows an exemplary one of many possible ringing codes which might be used in the inventive system.

Observe from FIG. 7 that all ringing codes are arranged to begin with a long burst of ringing. Hence, transistor 96 is enabled only if at least one long count is stored in counter 50 and if the end of code memory 87 is reset by timer 44. That is we must have at least one long burst before accepting a short burst. When transistor 96 turns off, it inhibits the re-encoder 52. When timer 45 times out 5 seconds after the end of the code, it sends a reset signal. A signal on wire 97 resets the flip-flop 87 to a normal condition. A signal on wire 98 resets the tip and ring memories 37, 38. A signal on wire 99 resets the flip-flops 79, 80, 83, 84.

The gates 85, 90 provide extra protection if the central office ringing machine should fail to start at the beginning of a cycle. That is a short burst is received before a long burst. In greater detail, the outputs $\overline{Q}$'s of flip-flops 79 and 80 are connected to gate 90 which detects the condition when both flip-flops 79 and 80 are idle. Similarly gate 85 detects the idle condition of flip-flops 83 and 84 as indicated by $\overline{Q}$ outputs. If flip-flops 83 and 84 are idle (that is no long burst registered) and if either flip-flop 79 or 80 or both are triggered, (one or more short burst registered) gate 85 will send a signal to reset the circuit to idle.

This circuit provides extra protection should the Central Office fail to start the ringing code at the beginning of a cycle.

Means are provided for re-encoding the ringing code that was received. After re-encoding, there is a decimal signal which becomes an identification of a particular subscriber station, connected to the transmission medium 23, which is being signaled. More particularly, after the complete ringing code is received, the long and short pulse counters 50, 51 are left standing with their outputs in one of many possible conditions which indicates the encoded value of the ringing current that is received. These counter outputs are re-encoded by the gates 52 in a known manner. For example, the wires may be traced back from the inputs of gate 102 to the Q output terminal of flip-flop 84, and the $\overline{Q}$ terminals of flip-flop 83, 80 and 79. Thus, the gate 102 reacts and turns off responsive to the receipt of two long pulses, and no short pulses, which is the second code in FIG. 7, here assumed to have the decimal identification "3". The other gates in encoder circuit 52 respond to the other ringing codes in a similar manner. The output of gate 102, for example, feeds through an inverter 103 to decimal "3" and " 4" gates 104, 105 in the re-encoder 52. Ringing current was assumed to have been received over the tip side of the line; therefore, the decimal "3" gate 105 is now enabled from gate 67, acting over wire 68. (Gate 104 would be enabled via wire 106 if ringing current had been received on the ring side R.) The output of this gate 105 acts through the OR gates 107, 108 to enable transistors 109, 110 and prepare to operate an "A" and "B" relay 111, 112.

Enable gates 47 conduct when the timer 45 sends out its reset signal, thereby turning on the transistor switch 96. Hence, the emitter ground on transistor 96 turns on transistors 109, 110 and operates the relays 111, 112. This, then is the decimal digit "3" in the binary weighted form 1 + 2. In like manner, any one of up to ten subscribers, in this example, is identified by up to ten different ringing codes received over either the tip or ring conductor. The identification occurs when corresponding relays (such as 111) operate.

Means are provided for sending out a multi-frequency tone signal representing the ringing code of the called party. More specifically each relay in the reencoder 52 operates correspondingly marked contacts in a binary relay contact tree 115. Thus, for example, when only "A" relay 111 operates, a circuit may be traced through "A" contacts 116 to wire 117 and through "A" contacts 118 to wire 119. If "A" and "B" relays 111, 112 operate simultaneously, the circuits are traced through "A" contacts 116, 122 and "B" contacts 120, 121 to wires 123, 119. Thus, a certain tap is always selected in both the high frequency transformer 125 H and low frequency transformer 125 L to generate two tones which represent the decimal identification of the received ringing codes. These transformers and the associated transistors 126, 127 are standard parts of the well known oscillator which is commonly used in a pushbutton telephone dialer throughout North America and elsewhere. Hence, it is thought that they do not have to be explained in any greater detail.

As long as ringing current is being received, the two tones are sent out because a control signal is sent responsive to ringing current on the tip side T (for example). The signal path is traced through contacts 62, wire 128, OR gate 65, wire 129, and resistor 128 to the base of transistor 127 which turns on. As long as transistor 127 is "on," its emitter ground is supplied to energize the transistor 126 which oscillates at the selected frequencies. The resulting multi-frequency wave form is sent through the operated contacts 131 and a coupling capacitor 132 to a carrier terminal 133. (In the assumed case, these are the multi-frequencies which identify the digits "3" in the pushbutton dialer.) Then the tones are transmitted over a medium 23 to a carrier terminal 134 at a distant end of the medium 23. Alternatively, the multi-frequencies can be sent over physical lines, or any other suitable transmission medium.

Figures 4, 6:
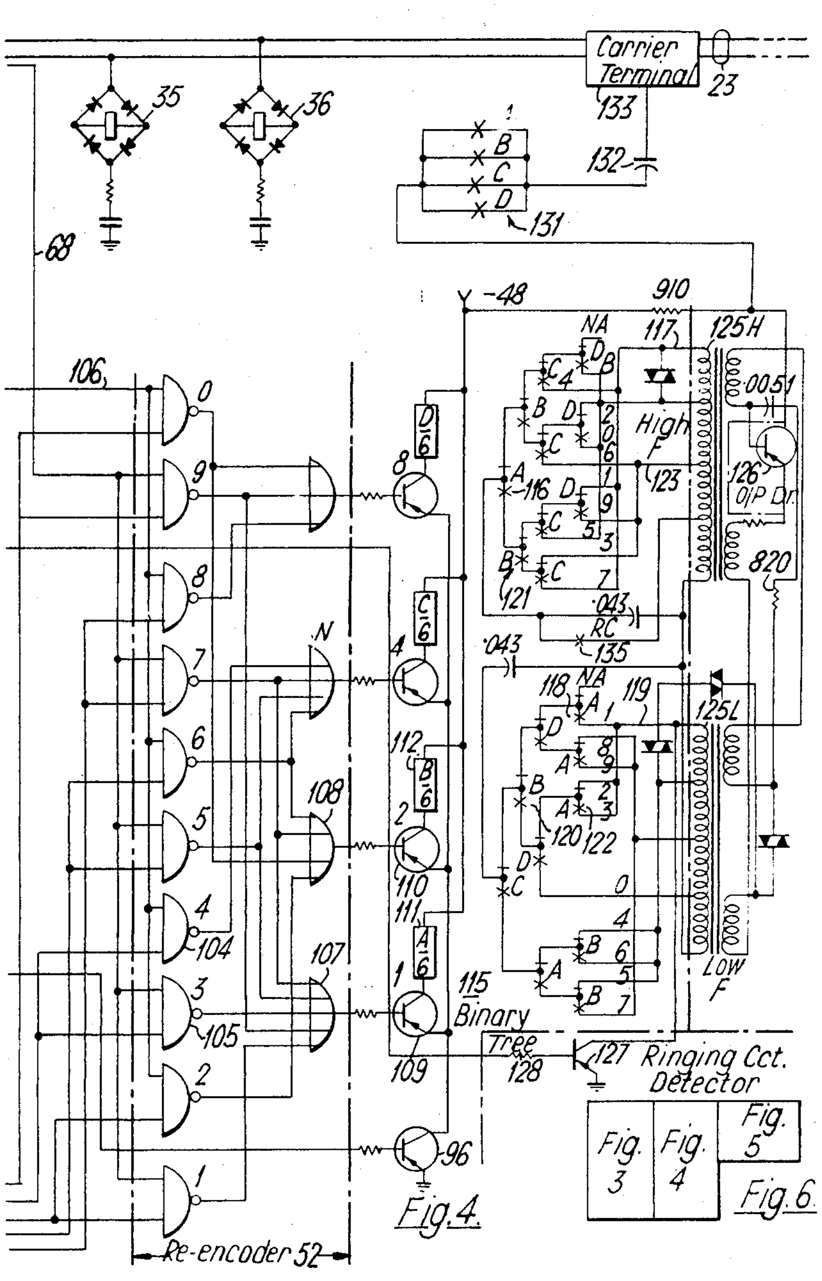
FIG. 6 ( on drawing sheet 4), shows how the FIGS. 3 –5 should be joined to provide a complete and understandable circuit.

In the case of revertive calls, a relay RC operates in the revertive call detector 57 (FIG. 3) to close contacts 135 (FIG. 4). This selects other taps on transformer 125 H and sends a tone having a different frequency which identifies the reverting nature of the call.

Figure 5:
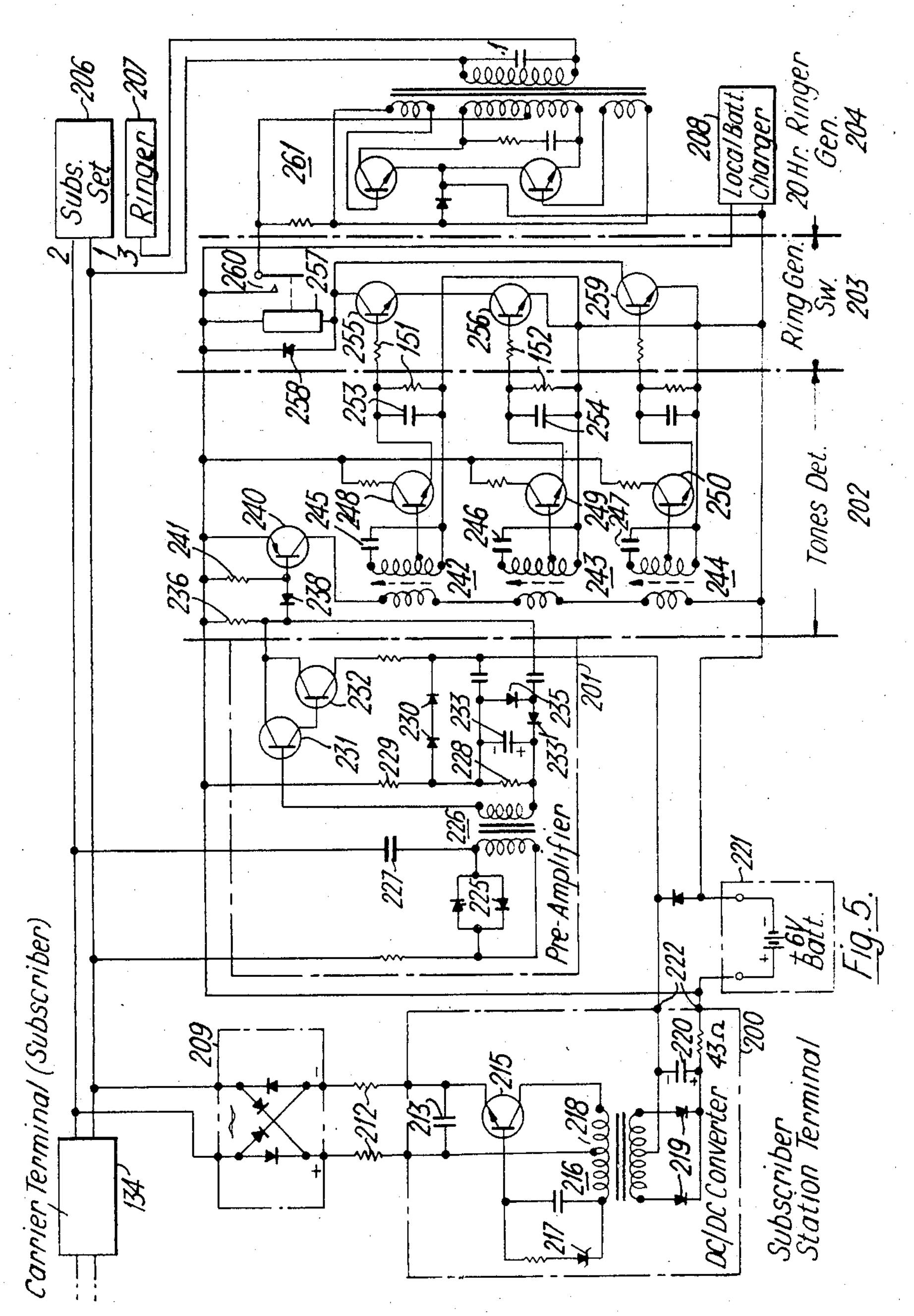

The subscriber station is shown in FIG. 5, as including a D.C. to D.C. converter 200, a pre-amplifier 201, a tone detector 202, a ringing current generator switch 203, a local ringing current generator 204, a subscriber station 206, a ringer 207, and an optional local battery charger 208. The converter 200 powers the ringing signal detector circuit of FIG. 5. More particularly, the D.C. to D.C. converter 200 is connected to the subscriber terminal 134 via a full wave rectifier 209, of any suitable design, and current limiting resistors 212. A capacitor 213 provides a voice signal by-pass. The transistor 215 is connected as an oscillator having a tank circuit 216 by-pass by a zener diode 217. The zener diode 217 prevents base current from reaching transistor 215 when any party on the line is off-hook. If the transistor 215 does not oscillate, there is no power for operating the circuit of FIG. 5. This way, there cannot be any response to a ringing signal if the station is off-hook and possibly dialing. On the other hand, a called station is not rung if it is off-hook. Therefore, there cannot be any confusion between the use of the same frequencies for ringing and dialing purposes.

The inductor 218 in the tank circuit 216 is also part of an output coupling transformer which is connected to an output rectifier unit 219. The capacitor 220 smooths the direct current voltage rectified at 219. Hence, the 48 -volt DC current on line 23 is converted to some other appropriate voltage when the oscillator circuit 215 –216 forms an A.C. wave which is stepped up or down by the transformer 218. Here, the voltage is stepped down to 6 -volts, and a small battery 221 is connected to float across the output terminals 222. If desired the supplemental battery charger 208 can also be used to charge the floating battery 221.

The multi-frequency tones sent over the line 23 are detected via a circuit including a Class A pre-amplifier 201 and tone detector 202. The pre-amplifier is connected to the terminal 134 and line 23 via an impedance matching circuit 225 and a coupling transformer 226. In this coupling circuit, the capacitor 227 and 233' 226 comprise a high pass filter circuit for passing only the frequencies falling within the pushbutton dialer, multi-frequency tone signalling band. The resistors 228, 229 provide a base bias voltage for the Class A amplifying transistors 231, 232 which are used in a Darlington configuration. The diodes 230 provide temperature compensation. The diode 233' rectifies a signal feedback from the collector of transistor 232 through the transformer 226 to the base of the transistor 131. The capacitor 233 provides a smoothing of a ripple in this feedback signal. The diode 235 passes negative half-cycles in the feedback signal to ground. The resistor 236 is a collector load for the transistors 231, 232. The output from the pre-amplifier 201 is applied to the input of the tone detector 202 via a coupling diode 238 which is poled to pass negative half-cycles.

The operational functions of pre-amplifier 201 are to pass the signalling frequencies while rejecting all other voice frequency signals. The output from the pre-amplifier is, therefore, an amplified replica of the ringing current signals received over the line 23.

The tone detector 202 includes standard parts of a pushbutton telephone signal receiver. However, the receiver filter circuits are selected according to the particular tones which actually are assigned to identify this particular called station. Obviously, there is no need to provide the full complement of tone receivers commonly required for all 10 digits used for signalling with pushbutton dialers.

In greater detail, these filters 242, 243, 244 in tone detector 202 are used in conjunction with a common driving amplifier 240 which is normally biased to an off-state by a potential applied to the base of the transistor 240 via a resistor 241. The transistor 240 turns on and saturates responsive to a signal from the pre-amplifier 201. Hence, the tone detector 202 is always attached with a square wave output from driver 240.

The output from transistor 240 is applied to the primary windings of the three transformers 242, 243, 244 which are turned by parallel connected capacitors 245, 246, 247. One tuned transformer 242 passes the high frequency, and one 243 passes the low frequency of the combination of tones which identifies the called station. The other tuned transformer 244 passes the revertive call identification tone. Responsive to an appearance of the high and low tones which identify the called subscriber, the transformers 242, 243, are induced to pass signals which turn on the transistors 248, 249. As each transistor turns on, it applies an "on" bias to a point on a voltage divider comprising the resistors 251, 252. Capacitors 253, 254 provide negative feedback. The pair of transistors 255, 256 turn on and constitute an AND gate which drives a relay 257. The relay's operating circuit may be traced from the positive (+) side of the battery 221 through the winding of the relay 257, transistors 255 and 256 to the negative side of the battery 221. The diode 258 provides spark protection when the relay 257 is de-energized.

The revertive call tone causes the transistors 250, 259 to turn on and duplicate the functions of the transistors 255, 256. Hence, the revertive tone path, including transistor 259, is, effectively, an OR gate with respect to the high-low frequency path. Either way the relay 257 operates, and the local bell 207 sounds.

Responsive to the operation of the relay 257, the contacts 260 close to apply a positive battery potential to the oscillator 261. This oscillator operates in a manner which is apparent to those who are skilled in the art and generates a 20 -cycle per second ringing current. The output of this oscillator is fed to the ringer 207 which rings to signal the called party.

Briefly, in resume, a central office operates in any known manner to seize and ring a called line with coded ringing. The inventive circuit monitors the line, detects the code, and regenerates a new code in the form of a particular digital signal, using the well known pushbutton telephone multi-frequency tones during the re-encoding. At each party line station, one telephone is wired to respond to the tones of a given digit. When those tones are received, a local oscillator is energized, and it generates a ringing signal. The local bell then rings.

While the principles of the invention have been described above in connection with specific apparatus and applications, it is to be understood that this description is made only by way of example and not as a limitation on the scope of the invention.

We claim:

1. A code ringing monitor system associated with a telephone party line extending between a code ringing central office and a plurality of party line subscriber stations, said monitoring means comprising: an electronic circuit means for decoding ringing signals appearing on said party line, means for re-encoding said ringing signals into multi-frequency digital signals, means for transmitting said multi-frequency digital signals over said party line to said plurality of stations, means at each of said stations for detecting the particular combination of said multi-frequencies which so identify that station, and means responsive to said detection of the frequencies which so identify that station for locally generating signalling current which signals the subscriber at that station, wherein said multi-frequency signals comprise combinations of tones used in pushbutton dialling and said re-encoding means comprises means for converting said digital signals into a corresponding multi-frequency pushbutton dialer digit signal, means for detecting reverting calls, and means responsive to said detection of a reverting call for sending a unique multi-frequency digital signal over said party line.

2. A selective ringing system comprising a telephone line having at least tip and ring conductors, ringing current detector means connected to each of said conductors, memory means responsive to said detector means for storing a memory of each occurrence of ringing current detected, means for measuring the duration of each occurrence of ringing current, means responsive to said measuring means for re-encoding said ringing current as a multi-frequency digital signal, and means for preventing a fragment of one ringing code from remaining in a memory means and mutilating the next ringing code.

3. The system of claim 2 wherein said mutilation prevention means comprises a gate responsive to a coincidence of the end of one ringing code and the start of the next ringing code.

4. The system of claim 2 and means for detecting reverting calls responsive to ringing current on both said tip and ring conductors, and means responsive to said reverting call detection for transmitting a unique multi-frequency digital signal to said line.

5. A telephone party line signalling system extending between a code ringing central office and a plurality of party line subscriber stations, comprising monitoring circuit means for decoding coded ringing signals appearing on a party line, said decoding means comprising means for classifying signals as to signal duration, separate means for counting signals of each classified duration, means responsive to the signal count for re-encoding said ringing signals from the ringing code into multi-frequency digital signals within voice range, means for transmitting said multi-frequency digital signals over said party line to said plurality of stations, means at each of said stations for detecting the particular combination of said multi-frequencies which uniquely identifies that station, and means responsive to said detection of the combination of the frequencies which so identify that station for locally generating signalling current for signalling the subscriber at that station.

6. A signalling system as claimed in claim 5, wherein said ringing signals comprise coded signal bursts, the first of each code being a long burst, means responsive to only the long bursts for enabling said re-encoding means, and means for resetting each system on a short duration burst occuring as the first of a code.

* * * * *